United States Patent [19]
Niinuma

[11] Patent Number: 5,656,183
[45] Date of Patent: Aug. 12, 1997

[54] REPAIRING METHOD WITH WELDING AND BUILD-UP WELDING APPARATUS FOR METAL MEMBER

[76] Inventor: Jun Niinuma, 4-27-3, Chiharadai, Ichihara-shi, Chiba 290, Japan

[21] Appl. No.: 568,666

[22] Filed: Dec. 7, 1995

[51] Int. Cl.$^6$ .................................................. B23K 9/04
[52] U.S. Cl. ................... 219/76.13; 219/137 PS; 219/137 R
[58] Field of Search ............... 219/76.13, 76.15, 219/76.16, 69.1, 130.51, 137 PS, 137 R

[56] References Cited

U.S. PATENT DOCUMENTS

| | | | |
|---|---|---|---|
| 2,592,414 | 4/1952 | Gibson | 219/76.15 |
| 2,994,762 | 8/1961 | Todd | 219/76.15 |
| 3,231,430 | 1/1966 | Krieger et al. | 219/69.1 |
| 4,405,851 | 9/1983 | Sheldon | 219/76.13 |
| 4,764,654 | 8/1988 | Ady | 219/76.13 |
| 5,378,867 | 1/1995 | Niinuma . | |
| 5,443,201 | 8/1995 | Cartry | 219/76.16 |

FOREIGN PATENT DOCUMENTS

| | | |
|---|---|---|
| 5-261585 | 10/1993 | Japan . |
| 5-261556 | 10/1993 | Japan . |
| 7-19667 | 5/1995 | Japan . |

Primary Examiner—Clifford C. Shaw
Attorney, Agent, or Firm—Ronald P. Kananen

[57] ABSTRACT

A metal member, such as a metal mold, can be securely repaired by a welding machine and an arc melting machine. A proper volume of fine welding powder or a thin sheet-type welding material is provided on the portion of the metal member to be repaired. A primary electrode of the welding machine is pressed to a portion of the welding powder or the welding material. A large pulse current of 300–1500 amperes is applied to the primary electrode for a short period of 1/1000–4/1000 seconds to form dot-shaped welded metal nuggets on the metal member, which nuggets are made to couple or overlap continuously with other plural welded metal nuggets. Thus, a build-up welding with nuggets, lines of nuggets or layers of nuggets is established and the welded portion has a desired thickness in a desired area of the portion to be repaired. The build-up welded portion of the metal member to be repaired is enveloped in an inactive gas atmosphere. A primary electrode of the arc melting machine is positioned at a place adjacent to the build-up welded portion and the arc melting machine applies the arc to the build-up portion for a short period so as to melt the welded metal again. The excess build-up welded portion is removed after the build-up welded portion is solidified and the repair is finalized by grounding.

5 Claims, 5 Drawing Sheets

Fig. 8
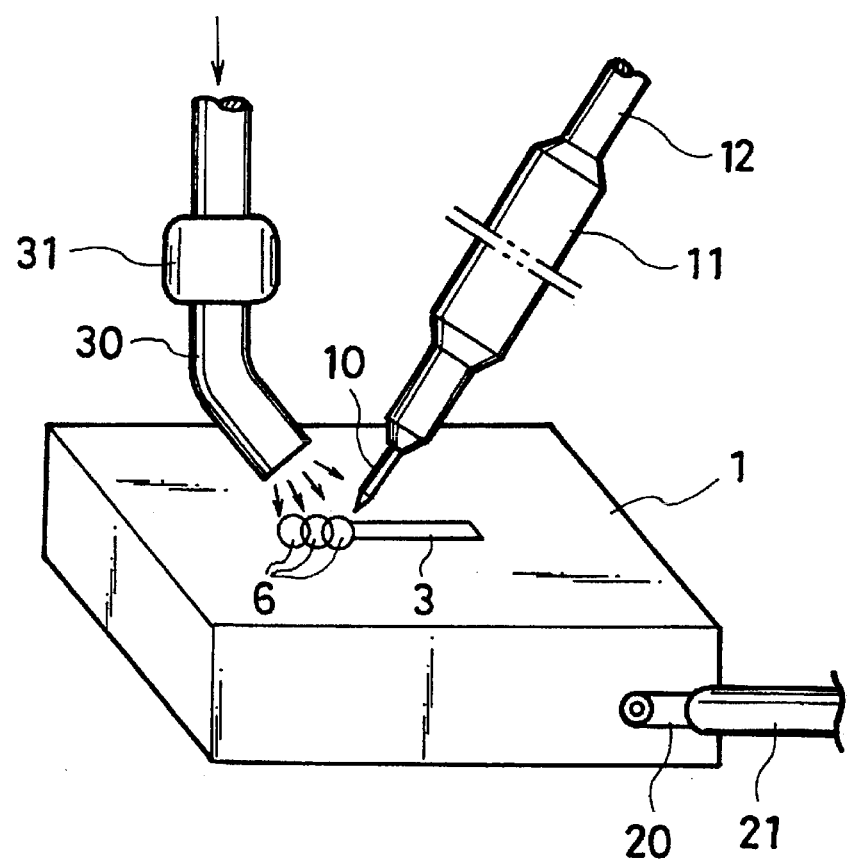
Fig. 9(A)  Fig. 9(B)  Fig. 9(C)
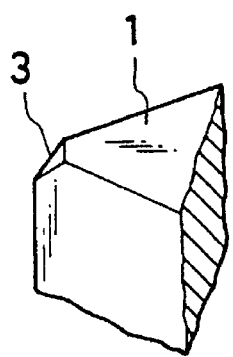 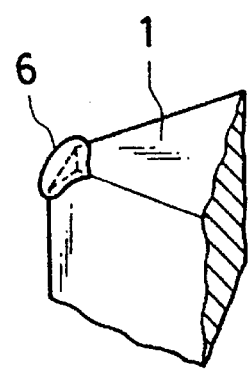 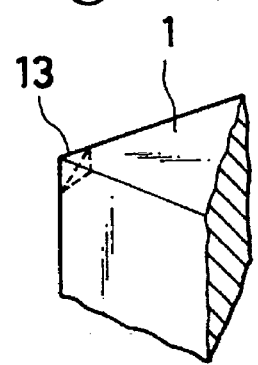

REPAIRING METHOD WITH WELDING AND BUILD-UP WELDING APPARATUS FOR METAL MEMBER

BACKGROUND OF THE INVENTION

This invention relates to a welding repair method for a metal member and a build-up welding apparatus used for this method. This invention can be applied to make minor corrections to the size of metal member, such as metal molds for rubber or synthetic resin products, and the like, and to repair a relatively minutely flawed portion of such metal member.

Metal molds are frequently flawed or distorted in size during the manufacturing process or when later put to use. It is often economically desirable to restore such metal molds by correcting or repairing the flawed portion or the size distortion. A build-up argon welding is now common for repairing and correcting such problems. According to such welding method, a welding rod is melted by arc in an argon atmosphere, the build-up welding is carried out at a fusion zone of the metal member, any extra welded portion is worn away after solidifying, and the repair is completed by grounding. Since this build-up argon welding method requires a continuous generation of a high 6,000 through 8,000 degree centigrade arc heat to melt the welding rod, various problems relating to heat may occur such as sinking and variation in shape and color of the metal member. Therefore, the build-up argon welding may not be proper for a relatively small correction or repair.

Other correction and repair methods have been proposed, including (a) silver brazing, (b) build-up metabolizing plating, (c) beating, and (d) embedding with insert. These methods have advantages but have many kinds of disadvantages which limit the ability to correct or repair the metal molds. For example, methods (a), (b) and (c) have poor endurance. Repair methods (b) and (d) require a long operation time and the repair method (c) requires a degree of technical skill. In addition, all of the methods (a) through (d) are inappropriate for correcting fine problems.

Japanese Unexamined Patent Publication No. 5-261585 and No. 5-261556 (both corresponding to U.S. Pat. No. 5,378,867) disclose a repairing method using welding and a build-up welding apparatus which can be used to repair a relatively minute collapsing or flawed portion of a metal member or to correct the size of the metal member, such as a metal mold for forming synthetic resin. According to the cited publications, a secondary electrode is connected to the metal member and a proper volume of fine welding powder is piled onto the portion of the metal member to be repaired or, alternatively, a thin sheet-type welding material is provided thereon. The welding powder or the welding material is pressed to the metal member locally and a large pulse current of about 300–1500 amperes is applied at the conduction point for a short period of about 1/1000–4/1000 seconds to form nuggets of welding on the metal member. Thus, the melted metal is built up on the part to be repaired in the form of dots or lines or as a layer. After solidifying, the excessively padded part of the build-up welding is removed and ground or polished. This repair method using welding and the build-up welding apparatus can accomplish alloy welding forming a single body for which the welded strength (the alloying factor) of the melted metal and the endurance of the weld are both strong and it is hard to separate the welded part from the metal member.

However, a detailed observation with a magnified microscopic photograph or the like shows the build-up welded portion (welded metal) has about 95% of the welding factor or alloying factor rather than 100%. The welding factor depends on the technical level of the worker since the welded metal (nuggets) may not be welded continuously due to a slight movement error during operation with the primary electrode. This is because each nugget is formed as a fine dot of about 0.6–1 mm diameter by a single pulse from the primary electrode of the build-up welding apparatus. These dot-shaped nuggets are coupled to each other or piled up as layers for build-up welding. A poor welding factor results in a separation of the build-up welded portion and failure of the repair.

It is therefore an object of the present invention to provide a repairing and correcting method and an apparatus for build-up welding that is appropriate for minute repairs and corrections without adversely affecting the metal member with excess heat.

It is another object of the present invention to provide a repairing/correction method and a build-up welding apparatus for such method wherein the build-up portion (welded metal) has excellent durability and quality, the repair and correction operation can be performed in a short time, and a high degree of technical skill is not required.

SUMMARY OF THE INVENTION

A welding repair method according to the instant invention uses the above-discussed build-up welding apparatus disclosed in Japanese Unexamined Patent Publication No. 5-261585 and No. 5-261556 (both of which correspond to U.S. Pat. No. 5,378,867) (hereinafter referred to as a welding machine) for a build-up having a desired depth by filling a portion of the metal member to be repaired with a welding metal. Then, according the invention, an additional build-up is formed in order to accomplish the above mentioned objects. A newly developed arc melting machine is used to envelop the welded metal fixed to the repaired portion of the metal member in an inactive gas atmosphere and to apply an arc for a short time, melting the welded metal again to form a fusion area. The welding machine deposits the build-up welding to the portion of the metal member to be repaired but the welding factor is not complete (for example, less than 95%). However, the invention can completely (100%) melt the welding area with the arc heat from the arc melting machine. After the nuggets (build-up portion) of the 100% alloy solidify, the excess portion is removed and ground in order to accomplish a perfectly welded repair.

The build-up welding apparatus of the invention used in the above method is comprised of a combination of a welding machine for build-up welding the melt metal to the metal member and an arc melting machine for melting the build-up weld metal again with the arc heat. The primary electrode of the welding machine forms a dot-shaped welded metal nugget 0.6–1.0 mm in size with the electrical activity of one pulse. The arc melting machine immediately melts 5–10 welded metal portions or nuggets, i.e., a cubic volume of 3–5 mm in diameter and 0.5–1 mm in depth, with a single discharge arc. The welded metal is perfectly melted and alloyed by uniform application of the arc to the build-up welded portion. The arc melting machine can melt the nuggets again into a single body using the arc and the size of the new melt is about 5–10 times the size of the original nugget formed by the welding machine.

The welding machine comprises a secondary electrode connected electrically to the metal member, a primary electrode having enough strength and shape to press the fine welding powder or a thin sheet type welding material to the portion of the metal member to be repaired and a power supply device for flowing a large pulse current of 300–1500 amperes between the primary and secondary electrodes for a short period, such as $1/1000$–$4/1000$ seconds. A magnetic piece may be mounted in the primary electrode so as to attract the fine welding powder to a proper position on the primary electrode. Such a primary electrode is disclosed in Japanese Examined UM Publication No. 7-19667.

The arc melting machine is comprised of a primary electrode for applying an arc adjacent to the welded metal (build-up welded portion) of the metal member, a secondary electrode connected electrically to the metal member, and a power supply device for producing an arc of a predetermined current range from the primary electrode to the welded metal (nuggets) by moving current through the build-up welded metal of the metal member and the primary electrode adjacent to the welded metal. The arc should be generated at the repair site at a current value of between 0 and 100 amperes for a period of 0.01 to 1.0 seconds, with a preferable range of 0.1 to 0.2 seconds. The primary electrode is thinning or tapering toward the tip. The primary electrode of the arc melting machine is covered by a holder made of an insulating material, such as a hard rubber, or is supported by a robot hand. The primary electrode of the arc melting machine may be tungsten or the like which does not itself melt and should have a tapering shape to better control the direction of the arc. A distance between the primary electrode and the welded metal of about 0.5 mm is best. The best current range is probably 0–70 amperes, in particular, 0–65 amperes. The arc melting machine has an inert gas supplying mechanism for enveloping the welded metal in an inactive gas atmosphere to prevent the welded metal from being oxidized.

There are two types of welding machine and arc melting machine. One is a combination type having a common electrical circuit for power supply and a control printed circuit board for both machines. The other type separates the machines, with each machine having its own circuit.

The metal member to which the welding repair method of this invention is applied may be metal molds for molding synthetic resin and rubber, die-cast molds, glass molds and the like. The metal molds may be made of beryllium, copper alloy, aluminum alloy, steel, stainless steel and the like.

The portion of the metal member to be repaired to which this invention is applied may be a parting line, an apex of three rib lines or ribs having abrasion, a shear droop, a broken part and so on. The portion to be corrected may also be a corner to be modified into a curve, a secondary sink, under-cut, blow hole, pit or a pin hole occurring after argon welding.

The welding material for the instant invention may be powder alloy (welding powder), thin sheet material, thin wire rod, sphere material, paste or other material. These materials are selected in connection with the size, shape and other conditions of the portion to be repaired. If the powder alloy (welding powder) is selected as the welding material, it is easy to repair a triangular portion, a rib and the like.

The inactive gas supplied by the inactive gas supplying mechanism may be argon, helium gas or other gas that is used generally to prevent the metal member and the welding material from being oxidized.

According to the present invention, after the welding machine build-up welds the welding material to the repair portion of the metal member, the primary electrode of the arc melting machine is placed over the build-up welded portion (welded metal) and the arc of a predetermined current value is applied to the welded metal for a short time by activating the power supply device so that the welded metal is instantly melted, forming the melt area, and is solidified. Thus, the welded and melted portions are perfectly (100%) alloyed and a stable build-up welded portion can be formed. By repeating the build-up welding of the welding material by the welding machine and repeating the arc re-welding by the arc melting machine, the high-quality, highly stable build-up welded portion can be established over all the portions to be repaired. Thereafter, the excess build-up portion is removed and ground so as to create a high-quality, stable repair or correction.

Since the build-up welding of the welding material and the application of the arc take an extremely short period, the metal member is not adversely affected by heat causing sinks, distortions, variations, bending, color changes or the like.

Since the metal member is alloyed and the build-up welding is performed as a single body, it will not be removed by a grounding on the order of $1/100$ mm, the endurance of the completed member is good, and the repair operation is not difficult. Thus, the invention does not require a long operation time or technical skill, and the quality and the completion level are not dependent on the skill of the worker. Since no poisonous gas is produced, the welding operation is safe. The removal volume of the build-up welded portion can be minimized, simplifying the finishing process. Therefore, the metal member for the metal mold and so on can be restored easily and reliably.

BRIEF DESCRIPTION OF THE DRAWINGS

This invention may best be understood by reference to the following description and the drawings of the embodiments. However, these drawings are used as description and not as limitation.

FIG. 8 is a perspective view showing the re-melting process for the build-up welded portion with a primary electrode of the arc melting machine;

FIGS. 9A, 9B and 9C are perspective views for illustrating the welding correction method for the apex of a triangular area metal member.

EMBODIMENTS

Embodiments of this invention will be discussed hereinafter with reference to the attached drawings.

Figure 1:
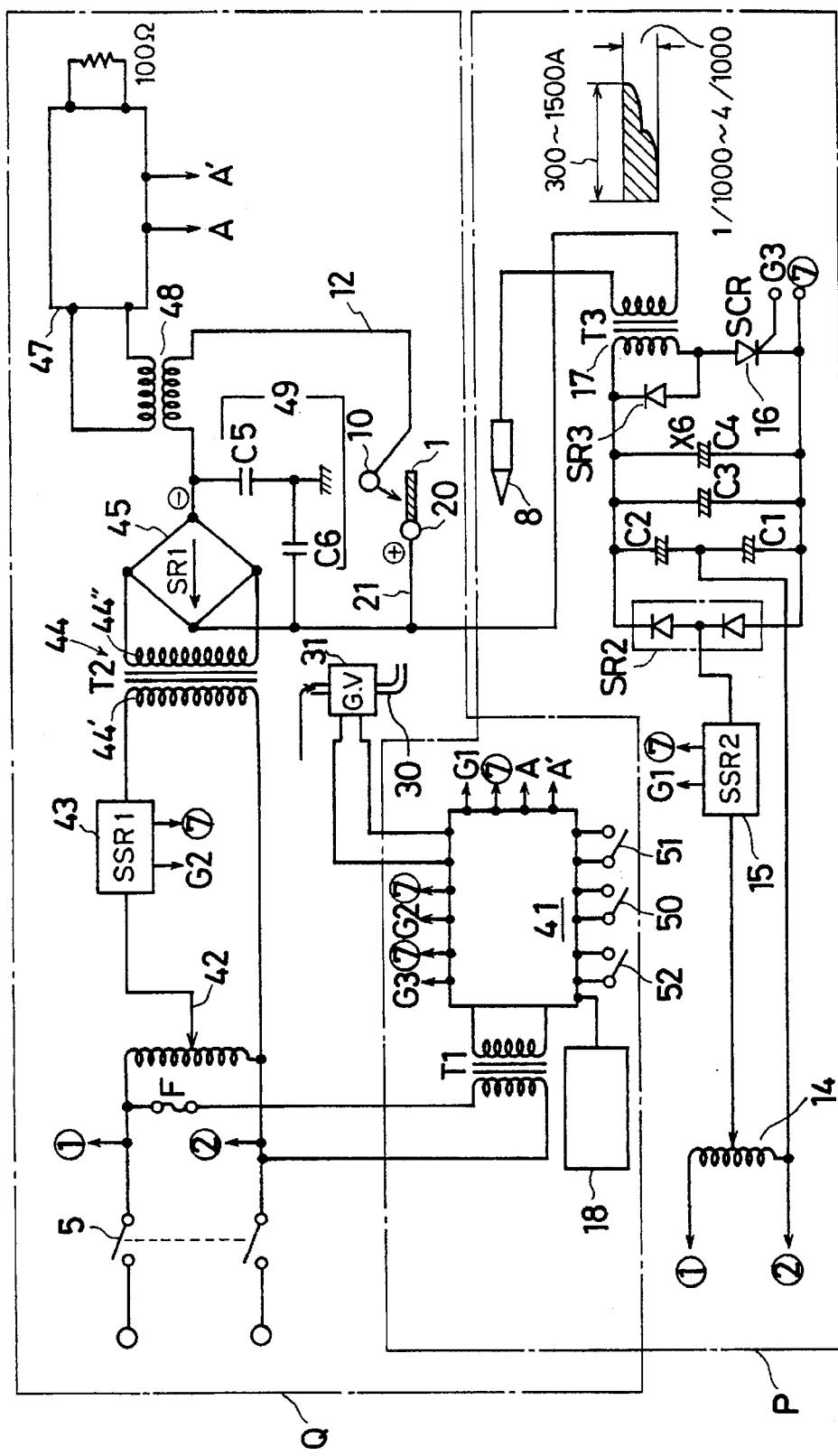
FIG. 1 is a circuit diagram of a power supply for a build-up welding apparatus according to this invention where a welding machine and an arc melting machine are combined.

FIG. 1 illustrates a power supply circuit for both a welding machine and a melting machine according to the instant invention. In this drawing, a reference P represents the power supply circuit for the welding machine and a reference Q represents the power supply circuit for the arc melting machine. The power supply circuit for the build-up welding apparatus is connected to a normal AC 100-volt line and a printed circuit board (PCB), as a control circuit 41, controls the whole apparatus.

The power supply P for the welding machine is discussed first. The power supply P supplies a voltage to a tapered primary electrode 8 and a secondary electrode 20 (used in common for both the welding machine and the arc melting machine) that is electrically connected to a metal member by connection means. When a power switch 5 is turned on, the power supply P operates allowing the welding operation with the welding material to take place. A single welding is executed with a single pulse produced every time a foot switch 50 is turned on by a worker. The welding voltage is adjusted within a range of about AC 0–10 volts by a voltage adjustment circuit 14 that is a single coil transformer having both ends connected to the AC line voltage via the switch 5. When the foot switch 50 is pushed or turned on, the controller 41 turns on a solid state relay (SSR) 15 that causes the charging of the capacitors C1, C2, C3 and C4. After that, a thyristor (SCR) 16 is triggered by the control circuit 41 so as to discharge these capacitors. Since the discharge current flows through a primary winding of a transformer 17, a low voltage large current (300–1500 amperes) flows through a secondary winding of the transformer 17. This large current flows instantly from a primary electrode 8 to a secondary electrode 20 for the welding. The pulse current waveform flowing through the primary electrode 8 is shown in FIG. 1 where the flowing time (1/1000–4/1000 seconds) is inversely proportional to the current value (300–1500 amperes). If the foot switch is continuously pressed or turned on, the charge and discharge operations are repeated intermittently so that the welding is performed continuously. The period of the intermittently charging and discharging operation can be adjusted within a range of 0.3–1.5 seconds by a digital timer that adjusts the control circuit 41 for the relay control period. The power supply device of FIG. 1 can be manufactured as compact portable equipment, light in weight.

Figure 2:
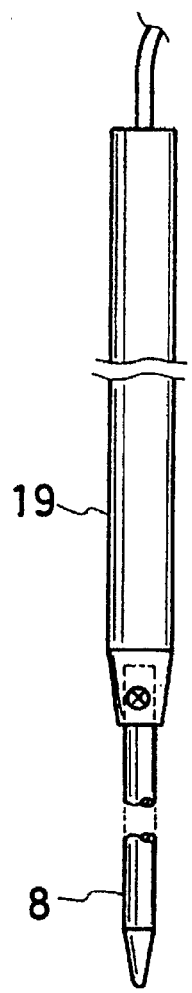
FIG. 2 is a frontal view of a manual-type primary electrode for the welding machine.
Figure 3A:
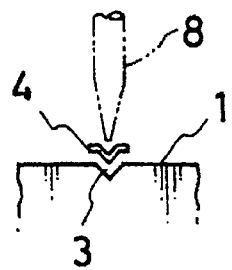
FIGS. 3A, 3B and 3C are elevation views for illustrating the build-up welding process using the primary electrode and a thin sheet-type welding material.
Figure 3B:
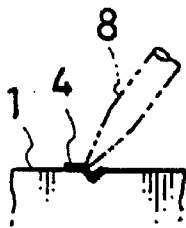
Figure 3C:
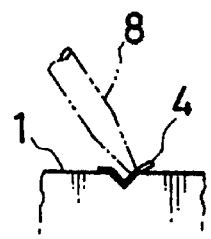

If the build-up welding operation is manually executed for the repair portion of the metal member, the primary electrode 8 is covered with an insulating electrode holder 19 as shown in FIG. 2. Then, the thin sheet-type welding material 4 is provided on the portion 3 of the metal member 1 to be repaired as shown in FIG. 3. The worker takes the electrode holder by hand and presses the tip of the primary electrode 8 to the welding material 4. The primary electrode 8 is moved as shown in FIGS. 3A through 3C so that the thin, sheet-type welding material fits into the groove of the repair portion 3. The foot switch 50 for the power supply device is turned on and a large pulse current of 300–1000 amperes is generated to form the welded metal (nuggets) on the repaired portion. In this instance, a nugget of the welding material melted by the current is alloyed with a melted dot portion of the metal member. When the primary electrode 5 is advanced pitch by pitch (the pitch corresponding to the diameter of the primary electrode 5), the plural melted parts of the welding material are coupled continuously or are piled up on multiple layers. Thus, the build-up welding is accomplished by forming the nuggets, lines or layers having enough thickness at the repair site. If it is desired to automatically execute the welding operation with a machine, the primary electrode 8 is mounted to a robot hand or the like and an automatic switch 51 in the power supply circuit is activated to control the whole system.

Figure 4:
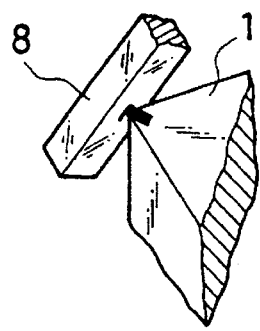
FIG. 4 is a perspective view of the build-up welding process for an apex of a triangle area.

FIGS. 9A–9C illustrate a triangle apex corner 3 (FIG. 9A) of a metal member 1 to be repaired, damaged by abrasion, obtuseness or collapse. FIG. 9B shows a condition where the build-up welded portion 6 is performed in sufficient mass at the repair site. For the build-up welding at the triangle apex corner, it is preferable to use a primary electrode 8 which has square bar (or flat bar) shape as shown in FIG. 4. The welding material 4 may be a thin sheet having a thickness of 0.2 mm and a 5 mm, positioned to cross over the repair portion. The tip of the primary electrode 8 is pressed to the welding material to perform a temporary spot welding for positioning the welding material. The primary electrode 8 is repeatedly moved in vertical and horizontal directions in order to weld the welding material spot by spot and then the build-up welded portion 6 is completed with multiple continuous welded metal nuggets. If the thickness of the build-up welded portion 6 is insufficient, the welding material 4 is bent and pressed by the primary electrode to form multi-layered nuggets. The build-up welding portion 6 is then melted again by the arc melting machine. After the melted portion is solidified, the excess part of the build-up welding portion is worn away by a tool, such as a scraper and is ground by a grinder or a file in order to restore the triangle apex corner 13 (FIG. 9C).

Figure 5:
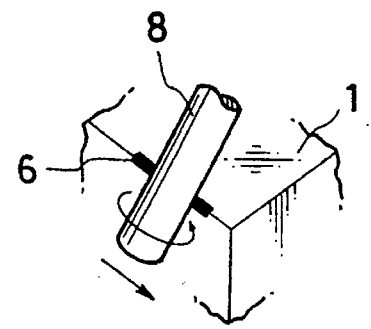
FIG. 5 is a perspective view showing the build-up welding process for a rib or edge of a metal member.

In the case of a repair to the rib (ridge-line) of a metal member 1, a thin sheet-type welding material is attached to the metal member 1 along the rib to be repaired. The round bar of the primary electrode 8 is rolled for welding (FIG. 5).

Figure 6:
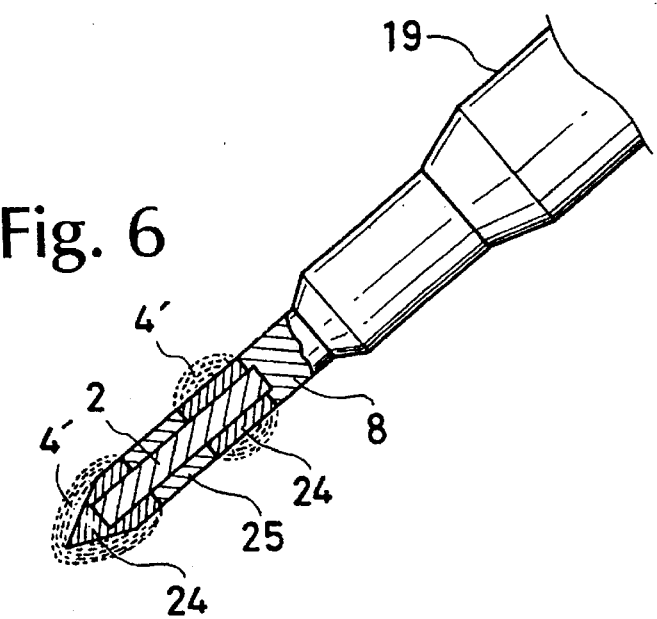
FIG. 6 is a side view of the primary electrode including a magnet for attracting welding powder, for which the main portion has been cut away.
Figure 7:
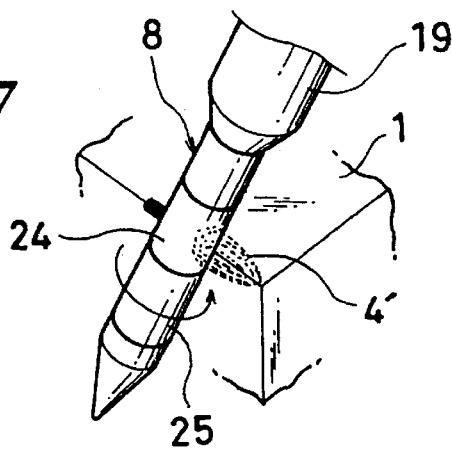
FIG. 7 is a perspective view showing the build-up welding process using the primary electrode for the rib of the metal member.

FIGS. 6 and 7 show a situation in which fine welding powder 4' is used as the welding material and the primary electrode 8 includes a permanent magnet 24. The powder is attracted to the outer surface of the electrode for the build-up welding. The permanent magnet 24 (or electromagnet) is mounted at the part of the primary electrode 8 where the welding powder 4' is attracted. A non-magnetic material 25 is used on the other side of the primary electrode 8 where the welding powder 4' is not being attracted. Since the permanent magnet 24 is provided at the welding portion attracting the welding powder 4', an appropriate volume of the welding powder is attracted to the outer surface of the electrode by the magnetic effect when the electrode is positioned adjacent to the magnetic powder 4'. Thus, the welding operation is easily accomplished by moving the primary electrode 8 to the repair portion 3 of the metal member 1. Since the primary electrode 8 has a permanent magnet 24 at the place where the welding powder 4' is attracted and has non-magnetic material 25 at the other portions, the required volume of the welding powder 4' is attracted only to the electrode area for welding. Thus, the portion of the electrode unrelated to the welding does not attract the powder and the welding job can be done with certainty and speed. As shown in FIG. 7, the primary electrode 8 is rolled while being moved for welding with powder 4' and the many dot-shaped welded metal portions (nuggets) are continuously formed in multiple layers for the build-up welding. If the thickness of the build-up welding is insufficient, an additional volume of the welding powder 4' is added.

Referring to FIG. 1 again, the arc melting machine Q is discussed below. The primary electrode 10 and the secondary electrode 20 for the arc melting machine are removably connected to the output terminals of the power supply device through cables 12 and 21 (refer to FIG. 8). The primary electrode 10 has a tapered pin shape for the purpose of guiding arc direction and is attached to the holder 11 through a collet (FIG. 8).

In order to prepare the re-melting operation by the arc melting machine Q for the welded metal 6 built up by the welding machine P at the build-up welding portion 3 of the metal member 1, the secondary electrode 20 is touched to an appropriate position of the metal member 1 to complete the electrical connection. After the power switch 5 in FIG. 1 is turned on to activate the power supply circuit, the arc current value is adjusted to between 0 and 65 amperes by a current adjusting device 42, such as a single winding transformer having the both ends receiving the AC line voltage. Then the primary electrode 10 is positioned near the repair portion 3 of the metal member 1, the distance between the electrode and the build-up welded metal 6 being 0.5 mm, and a foot switch 52 is pressed. In response to the foot switch activation, the controller in the printed circuit board 41 instructs an automatic valve 31 to open. The valve 31 is mounted at an inactive gas supplying pipe 30 that is coupled to the gas tank. Thus, argon gas flows out to make an argon gas atmosphere adjacent to the prepared portion 3. The argon gas supplying pipe 30 is configured as a single body with the holder 11 of the primary electrode 10. The controller 41 drives a solid stage relay (SSR) 43 as a switching device such that the current flows through an input winding 44' of a main transformer 44 for a predetermined short period (0.01–1.0 seconds). The current occurs at an output winding 44" of the main transformer 44 because of electromagnetic induction and this current is rectified to a DC current by a rectifier 45 and smoothed by capacitors C5 and C6. A high-frequency oscillator 47 produces a high-frequency signal under control of the controller 41 and the high frequency signal amplitude is increased by a high frequency coupling transformer 48 and is superimposed with the DC current. Thus a high-frequency signal (about 0.1–2 Mhz) is applied between the primary electrode 10 and the metal member 1. In other words, a conductive path is formed between the primary electrode 10 and the welding material 3 after about 0.8 seconds has passed from the foot switch (on) operation so that the primary electrode 10 starts to generate an arc without any additional operation. After about 2.5 second has passed after an arc is generated, the valve 31 opens to release the argon gas (after gas) in order to envelop the arc melted portion of the build-up welding 6 in an inactive gas atmosphere. This operation is controlled by the controller 41. In FIG. 1, the reference 49 represents a high-frequency bypass consisting of the capacitors C5, C6. If the switch 51 is always pushed (on), the above-described operations are repeated at predetermined intervals so that the arc re-melting operation for the build-up welded portion is performed continuously. The controller 41 receives a drive voltage from the AC line through the switch 5, a fuse F and a transformer T1.

A single arc melts 5 to 10 nuggets at the repair portion 3 of the metal member 1 formed by the build-up welding with the welding machine. After solidifying, the single raised build-up welded portion 6 are reformed. FIG. 8 shows three build-up welded portions 6 produced by using the arc three times. Each arc area is overlapped with the adjacent arc areas by one third for each side in order to prevent the build-up welded portions from being separated. The aforementioned operations are repeated until all the repaired portions are covered with the build-up welded portions 6. After that, the excess portion is removed and the member is ground.

Figure 10:
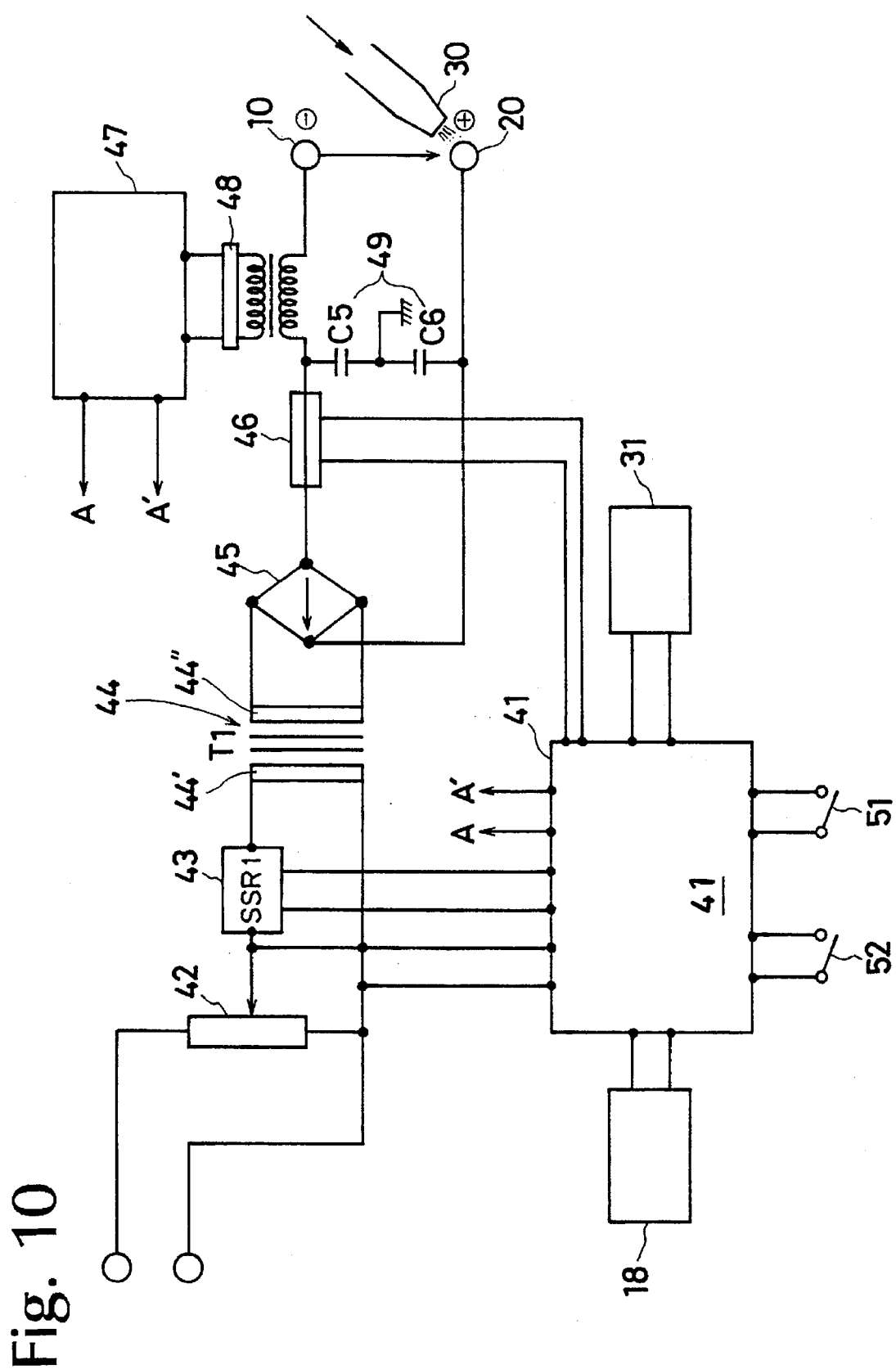
FIG. 10 is a circuit diagram of a separate-type power supply only for the arc melting machine.

FIG. 10 shows a power supply circuit only for the arc melting machine when the welding machine and the arc melting machine each has its own power supply device. The circuit diagram of FIG. 10 corresponds to the large block Q surrounded by the alternate long and short dash line. However, the power supply in FIG. 10 includes a current detector 46 inserted between the rectifier 45 and the transformer 48. Thus, the controller 41 can monitor the arc current and correct it if it is not the desired value. Since the other configurations and operations are the same as those relating to FIG. 1, no further description will be given.

Although the above description was made only on the preferred embodiments of the present invention, it is apparent to those skilled in the art that various modifications can be made without departing from the scope and sprit of the present invention. The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A welding repair method for a metal member, comprising the steps of:

providing a proper volume of fine welding powder or a thin sheet-type welding material on a portion of said metal member to be repaired, pressing a primary electrode of a welding machine to a portion of said welding powder or said welding material, applying a large pulse current of 300–1500 amperes to said primary electrode for a short period of $1/1000$–$4/1000$ seconds to form dot-shaped welded metal nuggets on said metal member, coupling or overlapping the plural welded metal nuggets continuously, thereby completing the build-up welding with nuggets, lines of nuggets or layers of nuggets having a desired thickness in a desired area of the portion to be repaired;

putting the build-up welded portion of the metal member to be repaired in an inactive gas atmosphere, positioning a primary electrode of an arc melting machine at a place adjacent to the build-up welded portion and applying the arc to the build-up portion for a short period of time so as to melt the welded metal again; and removing the excessive build-up welded portion after the build-up welded portion is solidified, and grinding the remainder for finishing.

2. A build-up welding apparatus, comprising:

a welding machine for build-up welding a welding material to a metal member; and an arc melting machine for melting the build-up welded portion again with an arc;

said welding machine including
a secondary electrode being connected electrically to said metal member,
a primary electrode having sufficient strength and a shape so as to be pressed to fine welding material or a sheet-type welding material attached on a portion of said metal member to be repaired, and
a power supply device for generating a large pulse current of 300–1500 amperes between said first and second electrodes for a short period of $1/1000$–$4/1000$ seconds; and said arc melting machine including
a primary electrode being positioned adjacent to the build-up welded portion formed on said metal member,
a secondary electrode being connected electrically to said metal member, a power supply device for forming a conductive path between said secondary electrode and said primary electrode positioned adjacent to the build-up welded portion and applying an arc of a predetermined current range from said primary electrode to said build-up welded portion during a short period of time, and an inactive gas supplying mechanism for enveloping the build-up welded portion in an inactive gas atmosphere before, during and after the generation of said arc.

3. A build-up welding apparatus as recited in claim 2, wherein when said welding machine build-up welds a fine welding powder to the portion of said metal member to be repaired, said primary electrode includes a permanent magnet on the inside of said electrode, and a magnetic fine welding powder is attracted to the outer surface of said electrode.

4. A build-up welding apparatus as recited in claim 2, wherein power supply circuits for said welding machine and said arc melting machine are combined into a single circuit.

5. A build-up welding apparatus as recited in claim 2, wherein power supply circuits for said welding machine and said arc melting machine are separately provided.

* * * * *